UNITED STATES PATENT OFFICE.

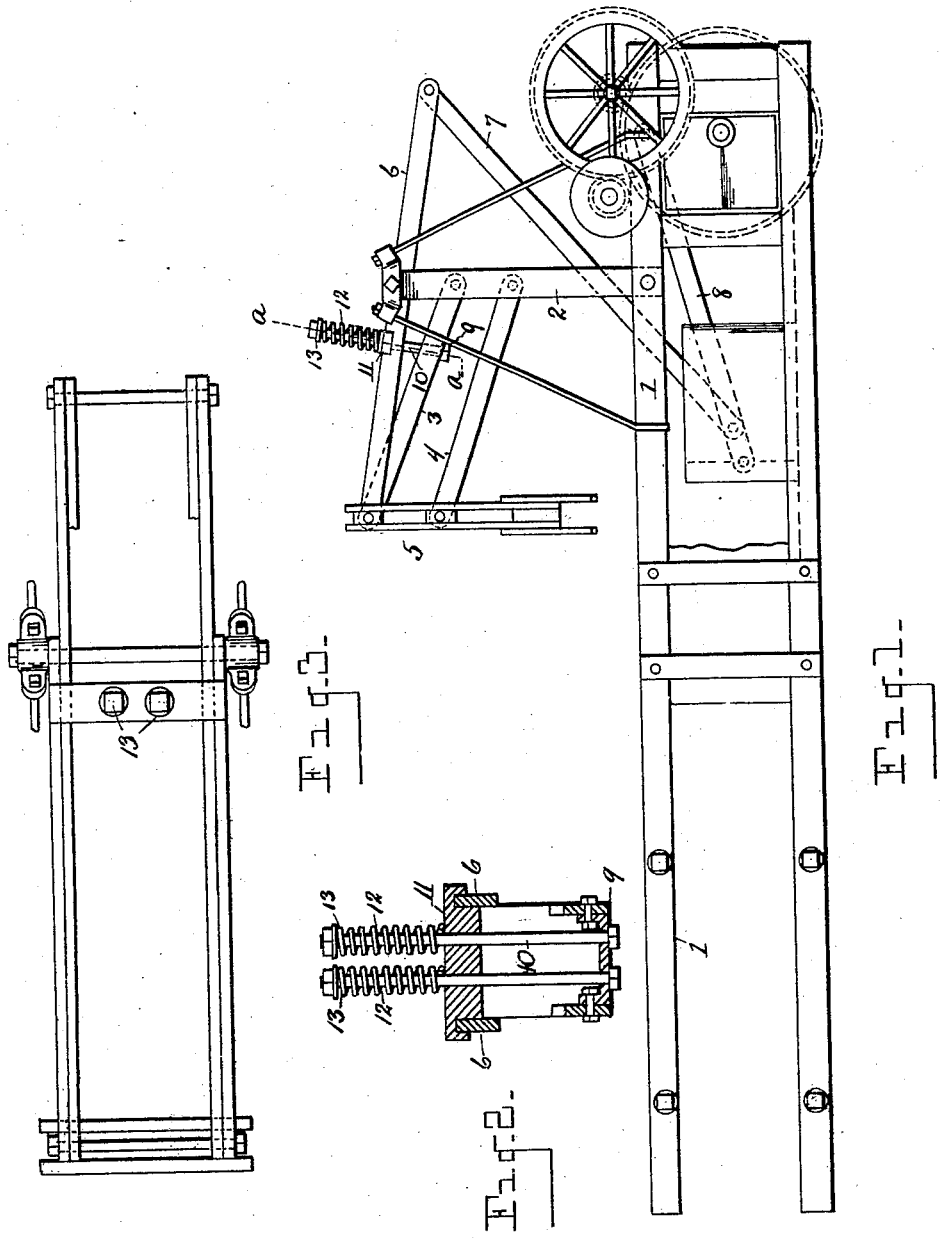

PUSEY W. MOORE, OF ANN ARBOR, MICHIGAN.

HAY-PRESS.

No. 863,302.     Specification of Letters Patent.     Patented Aug. 13, 1907.

Application filed March 28, 1907. Serial No. 365,159.

*To all whom it may concern:*

Be it known that I, PUSEY W. MOORE, a citizen of the United States, residing at Ann Arbor, county of Washtenaw, State of Michigan, have invented a certain new and useful Improvement in Hay-Presses, and declare the following to be a full, clear, and exact description of the same, such as will enable others skilled in the art to which it pertains to make and use the same, reference being had to the accompanying drawings, which form a part of this specification.

This invention relates to hay presses; it has for its object an improved adjustable fulcrum for the feeder bar of a hay press.

In the drawings:—Figure 1, is a side elevation. Fig. 2 is a cross section at the lines *a—a* of Fig. 1. Fig. 3 is a plan of the bar construction.

On the frame 1, of a hay press of ordinary construction, is mounted a post 2, to which are pivoted the parallel bars 3 and 4, which guide the feeder member 5; a vertical reciprocating movement is given to the member 5, by means of the lever 6 and the link 7, of which the link 7 is pivoted to the pitman 8, the lever 6 is pivoted to the link 7, and to the top end of a feeder member 5. On the upper member 3 of the parallel bars 3 and 4, is secured a plate 9 which carries a number of upwardly rising rods or bolts 10; provision is made for a slight oscillation of the bolts; these pass through a saddle 11, which rides on the members of the bar 6; the bar 6 being made with a pair of parallel bars in the usual way. The bolts or rods 10 carry springs 12 inserted between the upper side of the saddle 11, and the collar 13 held to the ends of the bolts. The saddle 11 thus becomes a yielding fulcrum capable of the necessary sliding movement along the bars 6, but also capable of yielding or following the bar 6 as the angle between the bar 6 and the bar 3 varies; the member 5 is therefore actuated in vertical reciprocation by the horizontal reciprocation of the pitman 8, and it nevertheless is capable of yielding sufficiently to prevent injury to the parts, should there be a more than common obstruction to its full and complete throw.

What I claim is:—

1. In a hay press, in combination with a pitman, a compressor member, connections between said member and pitman whereby the compressor member is actuated, connections between the compressor member and a fixed part of the frame, whereby the compressor member is guided and a fulcrum member yieldingly held to a guiding member and bearing against an actuating member, substantially as described.

2. In a hay press, in combination with the compressor member, parallel bar guides therefor, an actuating lever, means for actuating said lever, a fulcrum yieldingly held to a guide member and slidably bearing against said actuating member, substantially as described.

3. In a hay press, in combination with the compressor member, parallel bar guides therefor, an actuating lever, means for actuating said lever, a yielding fulcrum normally holding said lever nearly parallel with said guides and adapted to slide along the length of either upon meeting unusual resistance to its normal pressure, substantially as described.

4. In a hay press, in combination with the compressor member, parallel bar guides therefor, an actuating lever, means for actuating said lever, a yielding fulcrum slidably held to a guide member and bearing against said actuating member, substantially as described.

5. In a hay press, in combination with the compressor member, parallel bar guides therefor, an actuating lever, means for actuating said lever, a yielding fulcrum oscillatingly held to a guide member, and slidingly engaging an actuating member, substantially as described.

6. A yielding fulcrum for the lever and guide bars of a hay press, having in combination with a base plate and a saddle adapted to engage said bars along their outer sides with respect to one another, one of said members being slidable with respect to the bar which it engages, binding bolts engaging therethrough, and springs engaging between the headed ends of said bolts and one of said members whereby an increase over the normal space between said bars is yieldingly opposed, substantially as described.

In testimony whereof, I, sign this specification in the presence of two witnesses.

PUSEY W. MOORE.

Witnesses:
CHARLES F. BURTON,
ELLIOTT J. STODDARD.